June 13, 1944. B. R. BENJAMIN 2,351,473
TRACTOR MOUNTED IMPLEMENT
Filed Jan. 26, 1942
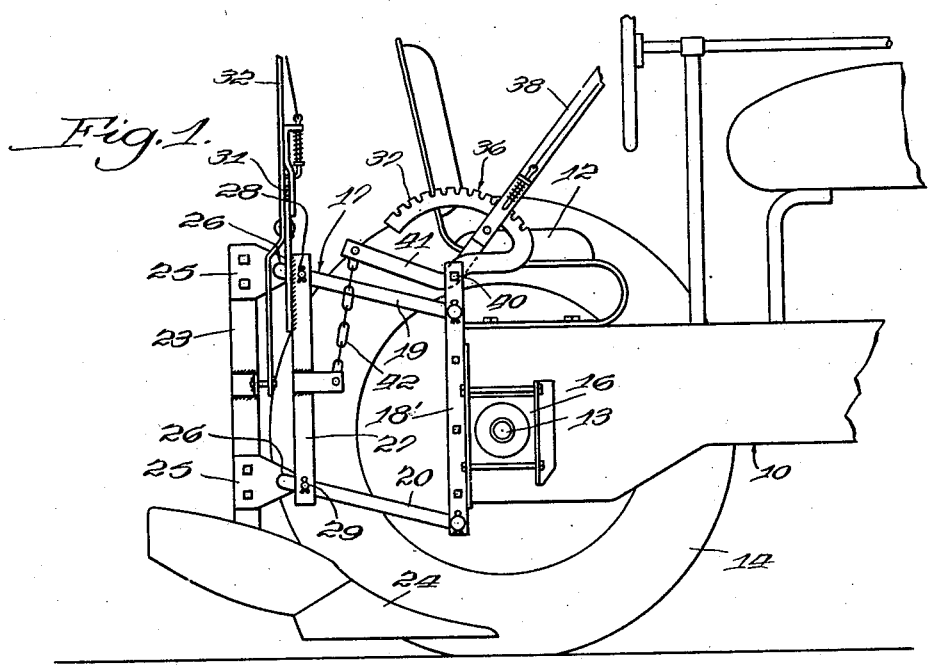
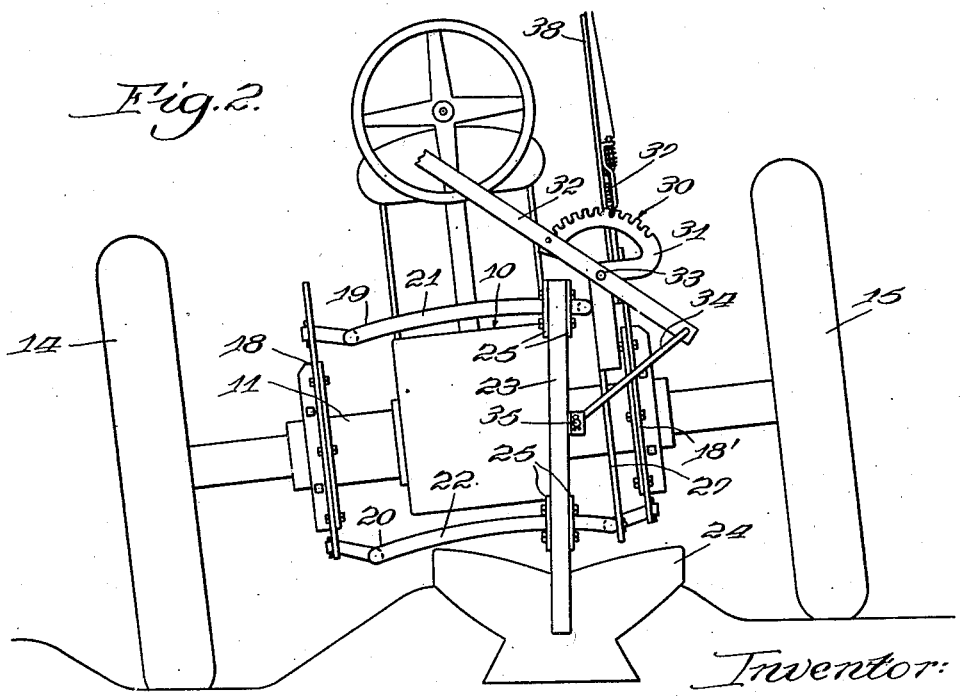
Inventor:
Bert R. Benjamin.
By Paul O. Pippel
Atty.

Patented June 13, 1944

2,351,473

UNITED STATES PATENT OFFICE 2,351,473

TRACTOR-MOUNTED IMPLEMENT

Bert R. Benjamin, Oak Park, Ill., assignor to International Harvester Company, a corporation of New Jersey Application January 26, 1942, Serial No. 428,231

5 Claims. (Cl. 97—47)

This invention relates to tractor-mounted implements and more particularly to a type of implement where, as the working tool is located in its ground-working position, one of the tractor wheels runs in a previously formed furrow.

It is the object of this invention to provide a tractor-mounted implement with a combined lateral shifting and leveling means, wherein as the working tool is laterally shifted it will be simultaneously leveled with respect to the ground.

According to the present invention, the tractor is one in which one of the wheels is adapted to run in a previously formed furrow, and the working tool is so connected to the tractor that the same may be moved laterally to a position removed from the wheel operating in the furrow, and while at the same time it is being shifted, it will be automatically leveled to compensate for the inclination of the tractor due to the one wheel being run in a furrow. The working tool is that of a middle buster plow bottom used for the forming of ridges across the field being tilled. This plow bottom has a vertically extending plow beam which in turn is connected to the tractor by means of vertically spaced lifting bails. Each of these bails has a transverse portion which is of arcuate shape, and the plow beam is connected to the lifting bails so as to be slidable over this arcuate portion. Since in this form of implement the plow bottom necessarily has to be moved to a position remote from the wheel running in the furrow in order to give the desired spacing of furrows, the use of this sliding movement is made by virtue of the arcuate portions to automatically level the plow at the same time it is laterally shifted. In this method of plowing the plow returns from its trip across the field with its opposite wheel located in the furrow whereupon the plow necessarily must be shifted to another position and laterally removed from a neutral position and in the opposite direction to which it was previously moved. A manual adjusting means accessible to the operator on the tractor is provided on the lifting bails and connected to the plow beam to effect lateral shifting of the plow beam.

For a better understanding of the invention reference may be had to the following detailed description taken in connection with the accompanying drawing, in which:

Figure 1 is a view in elevation of the rear portion of the tractor with the implement embodying the features of the present invention attached thereto; and Figure 2 is a rear view of the same tractor with one of its wheels running in the furrow and with the plow bottom of the implement laterally shifted to a position removed from the wheel running in the furrow.

Referring now to the drawing, there is shown a rear portion 10 of a tractor or tool-supporting means having a transversely extending rear axle structure 11 with an operator's station 12 located thereon. Extending through the rear axle structure 11 is a rear axle 13 to which is connected the rear traction wheels 14 and 15 of the tractor.

Formed on the rear axle structure 11 are implement attaching portions 16 located respectively at opposite sides of the tractor and adapted for attachment to the tractor of a tractor-mounted implement 17.

The tractor-mounted implement embodying the features of the present invention includes bracket-attaching structures 18 and 18' laterally spaced with respect to each other and in alinement for connection with the attaching portions 16 on the rear axle structure 11 of the tractor.

These attaching brackets 18 and 18' extend vertically a considerable distance above and below the rear axle structure when mounted on the tractor and have connected thereto a pair of vertically spaced upper and lower lifting bails 19 and 20. Each of these lifting bails is pivotally connected between the vertically extending bracket structures 18 and 18' and is adapted for vertical movement. The free ends of these bails include transverse arcuate-shaped portions 21 and 22, respectively, the portions being curved throughout their extent and generally concentric with respect to a point of generation therebelow.

Connected to these transverse portions for lateral sliding movement thereover is a vertically extending tool beam 23, on the lower end of which is provided a middle buster plow bottom or working tool 24. The connection of the beam 23 with the transverse portions includes spaced plates 25 rigidly connected to the beam, each having an opening 26 through which projects the transverse portion of the lifting bails. These openings are of sufficient diameter to allow a certain amount of looseness and freedom of movement of the plow beam 23 for its movement over the transverse portions 21 and 22.

Also carried on the free ends of the bails 21 and 22 is a supporting structure 27 pivotally connected at 28 and 29, respectively, with the lifting bails 21 and 22 and on which is supported a manually adjustable means 30. This manually adjustable means 30 includes a transversely extending quadrant 31 and a lever 32 adapted to work over the quadrant and to be pivoted about a longitudinally extending axis 33. To the lower end of the lever 32 is connected a link 34 which in turn is connected to the vertically extending plow beam 23, as indicated at 35. The lever 32 extends upwardly to be accessible to the operator and as it is moved over the quadrant, the plow beam will be laterally shifted over the transverse portions 21 and 22 of the lifting bails.

When the lever 32 extends vertically or in the center of the quadrant 31, the plow beam 23 will be located at a mid-portion on the transverse portions 21 and 22 of the bail and in a neutral position where the middle buster bottom would be located when one of the tractor wheels is not running in a furrow, such as when the tractor first traverses the field during the opening-up operation and where there are no furrows in which one of the wheels of the tractor is to run.

After the field has been opened up and the left wheel 14 must run in a furrow, the plow beam 23 and its associated plow bottom 24 is moved laterally to the right by depressing the lever 32 to a position such as shown in Figure 2. It should be noted that when the left tractor wheel 14 is run in the furrow the tractor is tilted downwardly to the left and that, were the transverse portions 21 and 22 not of arcuate shape, the plow bottom while shifted laterally to the right would not be laterally leveled with respect to the ground. By the provision of arcuate-shaped portions bent upwardly, it should be apparent that this leveling of the plow bottom is automatically taken care of as the same is shifted to the right.

On the return trip of the tractor across the field, the right wheel 15 may then run in the previously plowed furrow. Thus the tractor is tilted in the opposite direction, and it becomes necessary that the plow beam 23 and its plow bottom 24 be shifted to the left, as viewed in Figure 2. This is done by the same lever 32 by moving the same to the right to its extreme position on the quadrant 31. Since the extent of the arcuate curve extends fully to the left as well as to the right, the plow bottom 24 will likewise be automatically leveled as the same is moved to the left.

Carried on the bracket 18' is a second manual adjusting mechanism 36 having a quadrant 37 and a lever 38 pivoted to operate about a transverse axis 40. On the lower end of the lever 38 is an arm portion 41 connected by a lost-motion chain means 42 to the supporting structure 27 on the free ends of the lifting bails. When it is desired to lift the plow bottom 24 out of its ground position to a transport position, such as shown in Figure 1, the operator may depress the lever 38 forwardly, thereby giving to the arm 41 a clockwise motion to effect tightening of the chain links 42 and lifting of the tool beam 23 with its plow bottom 24.

It should now be apparent that there has been provided by the above described structure, means for effecting automatic leveling of the plow bottom as the same is laterally shifted to the right or left of a neutral or central position with respect to the tractor. The leveling of the plow beam is effected automatically as the beam and its tool are shifted laterally.

While various changes may be made in the detail construction, it shall be understood that such changes shall be within the spirit and scope of the present invention as defined by the appended claims.

What is claimed is:

1. In combination, a tool-supporting structure having spaced wheels, said wheels being adapted to run in a plowed furrow, a plow beam with a plow thereon, a lifting bail having an arcuate-shaped transverse portion, means for pivotally connecting the bail to the tool-supporting structure so that its transverse portion is free for vertical movement, means for connecting the plow beam to the arcuate transverse portion of the bail for lateral sliding movement thereover, means for effecting translational movement of said beam to laterally disposed positions with respect to a neutral position, the said arcuate-shaped portion being such that as the plow beam is laterally adjusted the plow will be simultaneously leveled for adaptation of the same with respect to the ground as the one or the other of said wheels is run in a furrow.

2. In combination, a tractor having spaced rear wheels, one of which being arranged to run in a plowed furrow, a plow beam with a plow thereon, means for supporting the beam on the tractor for adjustment to laterally disposed positions from a neutral position, means for translationally adjusting the plow beam laterally to positions near one or the other of said rear wheels and said supporting means including an arcuate-shaped portion over which the plow beam is adjustable to thereby be leveled with respect to the ground as the said rear wheel is run in a plowed furrow, whereby said plow will be simultaneously leveled upon being laterally adjusted.

3. In combination, a tool-supporting structure, a pair of vertically spaced lifting bails pivotally connected to the tool-supporting structure for vertical movement with respect thereto, each of said bails having an arcuate-shaped transverse portion generally concentric to a common point of generation, a working tool, a vertically extending tool beam for the working tool, means for connecting the tool beam to the transverse portions for lateral movement with respect thereto, and means for laterally adjusting the tool beam and retaining the same in its laterally adjusted position, the difference in curvature of said portions being such that the working tool is automatically tilted while being moved to its laterally adjusted position.

4. In combination, a tractor having a rear axle structure with laterally spaced attaching portions and laterally spaced wheels thereon, an implement adapted to be connected to the tractor including attaching brackets adapted for alinement with the spaced attaching portions, a pair of vertically spaced lifting bails pivotally connected to the bracket for vertical movement, each of said bails having an arcuate-shaped transverse portion generally concentric to a common point of generation, a vertically extending plow beam having a plow thereon connected to the arcuate-shaped portions of the bails to slide laterally thereover, the difference in curvature of the arcuate portions being such that as the beam slides thereover the plow will be leveled with respect to the ground as one of the wheels is run in a plowed furrow, and means for adjustably sliding the beam over the arcuate portions.

5. In combination, a tool-supporting structure, a working-tool, means for connecting the working-tool to the tool-supporting structure for vertical movement including a vertically pivotable member having a transverse portion, a tool-carrying beam, means connecting said beam with the transverse portion of the pivotable member for translational adjustment thereon laterally of the tool-supporting structure, means for so laterally adjusting said beam, said transverse portion being arcuately shaped to cause said beam to tilt as it is laterally adjusted thereon.

BERT R. BENJAMIN.